(12) United States Patent
Gupta et al.

(10) Patent No.: US 11,270,134 B2
(45) Date of Patent: *Mar. 8, 2022

(54) METHOD FOR ESTIMATING DISTANCE TO AN OBJECT VIA A VEHICULAR VISION SYSTEM

(71) Applicant: MAGNA ELECTRONICS INC., Auburn Hills, MI (US)

(72) Inventors: Nikhil Gupta, Brampton (CA); Galina Okouneva, Markham (CA); Liang Zhang, Kanata (CA)

(73) Assignee: MAGNA ELECTRONICS INC., Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/946,937

(22) Filed: Jul. 13, 2020

(65) Prior Publication Data
US 2020/0342243 A1    Oct. 29, 2020

Related U.S. Application Data

(63) Continuation of application No. 14/969,527, filed on Dec. 15, 2015, now Pat. No. 10,713,506.

(60) Provisional application No. 62/093,743, filed on Dec. 18, 2014.

(51) Int. Cl.
*G06T 7/579* (2017.01)
*G06K 9/00* (2022.01)

(52) U.S. Cl.
CPC .......... *G06K 9/00805* (2013.01); *G06T 7/579* (2017.01); *G06T 2207/30261* (2013.01)

(58) Field of Classification Search
CPC ................................ G06K 9/00; G06T 7/579
See application file for complete search history.

(56) References Cited

U.S. PATENT DOCUMENTS

| 4,600,913 A | 7/1986 | Caine |
| 4,907,870 A | 3/1990 | Brucker |
| 4,971,430 A | 11/1990 | Lynas |
| 5,097,362 A | 3/1992 | Lynas |
| 5,177,685 A | 1/1993 | Davis et al. |
| 5,189,561 A | 2/1993 | Hong |

(Continued)

OTHER PUBLICATIONS

Hartley et al., "Multiple View Geometry in Computer Vision, Second Edition" Cambridge University Press, 2003, Secion 1.4 "Three View Geometry." (Year 2004).

*Primary Examiner* — Kyle M Lotfi
(74) *Attorney, Agent, or Firm* — Honigman LLP

(57) ABSTRACT

A method for estimating distance to an object via a vehicular vision system includes disposing a camera at a vehicle so as to view at least exterior of the vehicle. An ECU is provided that includes an image processor. Multiple frames of image data are captured via the camera while the vehicle is moving, and are provided to the ECU. The provided captured frames of image data are processed to determine a three dimensional object present in a field of view of the camera, and a point of interest is determined on the determined object. An estimated location in three dimensional space of the determined point of interest relative to the vehicle is determined, and distance to the estimated location is estimated by comparing provided captured frames of image data where there is movement of the determined point of interest of the determined object relative to the camera.

17 Claims, 12 Drawing Sheets

US 11,270,134 B2

Page 2

(56) References Cited

U.S. PATENT DOCUMENTS

| | | |
|---|---|---|
| 5,424,952 A | 6/1995 | Asayama |
| 5,500,766 A | 3/1996 | Stonecypher |
| 5,521,633 A | 5/1996 | Nakajima et al. |
| 5,550,677 A | 8/1996 | Schofield et al. |
| 5,581,464 A | 12/1996 | Woll et al. |
| 5,642,299 A | 6/1997 | Hardin et al. |
| 5,670,935 A | 9/1997 | Schofield et al. |
| 5,715,093 A | 2/1998 | Schierbeek et al. |
| 5,790,403 A | 8/1998 | Nakayama |
| 5,796,094 A | 8/1998 | Schofield et al. |
| 5,877,897 A | 3/1999 | Schofield et al. |
| 5,884,212 A | 3/1999 | Lion |
| 5,949,331 A | 9/1999 | Schofield et al. |
| 6,097,023 A | 8/2000 | Schofield et al. |
| 6,185,492 B1 | 2/2001 | Kagawa et al. |
| 6,201,642 B1 | 3/2001 | Bos |
| 6,222,447 B1 | 4/2001 | Schofield et al. |
| 6,243,003 B1 | 6/2001 | DeLine et al. |
| 6,278,377 B1 | 8/2001 | DeLine et al. |
| 6,285,393 B1 | 9/2001 | Shimoura et al. |
| 6,313,454 B1 | 11/2001 | Bos et al. |
| 6,317,057 B1 | 11/2001 | Lee |
| 6,320,176 B1 | 11/2001 | Schofield et al. |
| 6,353,392 B1 | 3/2002 | Schofield et al. |
| 6,396,397 B1 | 5/2002 | Bos et al. |
| 6,411,204 B1 | 6/2002 | Bloomfield et al. |
| 6,420,975 B1 | 7/2002 | DeLine et al. |
| 6,433,676 B2 | 8/2002 | DeLine et al. |
| 6,485,155 B1 | 11/2002 | Duroux et al. |
| 6,487,501 B1 | 11/2002 | Jeon |
| 6,594,583 B2 | 7/2003 | Ogura et al. |
| 6,823,241 B2 | 11/2004 | Shirato et al. |
| 6,882,287 B2 | 4/2005 | Schofield |
| 6,946,978 B2 | 9/2005 | Schofield |
| 7,004,606 B2 | 2/2006 | Schofield |
| 7,038,577 B2 | 5/2006 | Pawlicki et al. |
| 7,400,236 B2 | 7/2008 | Kade et al. |
| 7,510,038 B2 | 3/2009 | Kaufmann et al. |
| 7,526,103 B2 | 4/2009 | Schofield et al. |
| 7,532,981 B2 | 5/2009 | Kataoka et al. |
| 7,557,732 B2 | 7/2009 | Kataoka et al. |
| 7,711,464 B2 | 5/2010 | Kaufmann |
| 7,720,580 B2 | 5/2010 | Higgins-Luthman |
| 7,914,187 B2 | 3/2011 | Higgins-Luthman et al. |
| 8,164,628 B2 | 4/2012 | Stein et al. |
| 8,930,081 B2 | 1/2015 | Bolourchi et al. |
| 9,147,260 B2 | 9/2015 | Hampapur et al. |
| 9,180,908 B2 | 11/2015 | Van Dan Elzen et al. |
| 9,205,776 B2 | 12/2015 | Turk |
| 9,340,227 B2 | 5/2016 | Bajpai |
| 10,713,506 B2 | 7/2020 | Gupta et al. |
| 2002/0003571 A1 | 1/2002 | Schofield et al. |
| 2002/0041229 A1 | 4/2002 | Satoh et al. |
| 2002/0159270 A1 | 10/2002 | Lynam et al. |
| 2002/0169531 A1 | 11/2002 | Kawazoe et al. |
| 2002/0188392 A1 | 12/2002 | Breed et al. |
| 2003/0025597 A1 | 2/2003 | Schofield |
| 2003/0052773 A1 | 3/2003 | Sjonell |
| 2003/0156015 A1 | 8/2003 | Winner et al. |
| 2003/0169522 A1 | 9/2003 | Schofield et al. |
| 2004/0098197 A1 | 5/2004 | Matsumoto et al. |
| 2004/0107035 A1 | 6/2004 | Tange et al. |
| 2004/0183663 A1 | 9/2004 | Shimakage |
| 2004/0230375 A1 | 11/2004 | Matsumoto et al. |
| 2004/0252020 A1 | 12/2004 | Matsumoto et al. |
| 2004/0262063 A1 | 12/2004 | Kaufmann et al. |
| 2005/0015203 A1 | 1/2005 | Nishira |
| 2005/0107931 A1 | 5/2005 | Shimakage et al. |
| 2005/0125125 A1 | 6/2005 | Matsumoto et al. |
| 2005/0125153 A1 | 6/2005 | Matsumoto et al. |
| 2005/0179527 A1 | 8/2005 | Schofield |
| 2005/0273234 A1 | 12/2005 | Rattapon et al. |
| 2005/0273261 A1 | 12/2005 | Niwa et al. |
| 2005/0278096 A1 | 12/2005 | Iwazaki et al. |
| 2006/0030987 A1 | 2/2006 | Akita |
| 2006/0047388 A1 | 3/2006 | Oka et al. |
| 2006/0164514 A1 | 7/2006 | Muramatsu et al. |
| 2007/0091173 A1 | 4/2007 | Kade et al. |
| 2007/0100551 A1 | 5/2007 | Ishikura |
| 2007/0225914 A1 | 9/2007 | Kawazoe et al. |
| 2007/0233343 A1 | 10/2007 | Saito et al. |
| 2007/0233386 A1 | 10/2007 | Saito et al. |
| 2008/0061952 A1 | 3/2008 | Maass |
| 2008/0080740 A1 | 4/2008 | Kaufmann |
| 2008/0183342 A1 | 7/2008 | Kaufmann et al. |
| 2008/0278349 A1 | 11/2008 | Kataoka et al. |
| 2009/0024279 A1 | 1/2009 | Takeda et al. |
| 2009/0085913 A1 | 4/2009 | Sakamoto et al. |
| 2009/0132125 A1 | 5/2009 | Yonezawa et al. |
| 2009/0153360 A1 | 6/2009 | Kim |
| 2009/0284360 A1 | 11/2009 | Litkouhi |
| 2010/0114431 A1 | 5/2010 | Switkes et al. |
| 2010/0121532 A1 | 5/2010 | Urai et al. |
| 2010/0145575 A1 | 6/2010 | Switkes et al. |
| 2010/0182139 A1 | 7/2010 | Chen et al. |
| 2010/0189306 A1 | 7/2010 | Kageyama et al. |
| 2010/0195908 A1 | 8/2010 | Bechtel et al. |
| 2010/0228420 A1 | 9/2010 | Lee |
| 2011/0001615 A1 | 1/2011 | Kuoch et al. |
| 2011/0231062 A1 | 9/2011 | Kim |
| 2011/0231095 A1 | 9/2011 | Nakada et al. |
| 2012/0050074 A1 | 3/2012 | Bechtel et al. |
| 2012/0320210 A1 | 12/2012 | Imai et al. |
| 2013/0093888 A1 | 4/2013 | Kim |
| 2013/0144521 A1 | 6/2013 | Mathieu et al. |
| 2013/0173115 A1 | 7/2013 | Gunia et al. |
| 2013/0182906 A1 | 7/2013 | Kojo et al. |
| 2013/0253767 A1 | 9/2013 | Lee et al. |
| 2013/0293717 A1 | 11/2013 | Zhang et al. |
| 2013/0314503 A1 | 11/2013 | Nix et al. |
| 2014/0176716 A1 | 6/2014 | Wallat et al. |
| 2014/0214276 A1* | 7/2014 | Yamamoto ................ B60R 1/00 701/41 |
| 2016/0180158 A1 | 6/2016 | Gupta et al. |
| 2016/0180180 A1 | 6/2016 | Gupta et al. |
| 2016/0364619 A1 | 12/2016 | Ogata et al. |

* cited by examiner

Use of Fish-eye Optics (Associated Problems)

- Some examples from side camera (The features not only vary in size, but also in orientation):

3D Point Registration Description

Problem definition:

- *Known information*: projection matrix ($P_i$), camera centre ($C_i$), and transformation matrix ($T_{i-1,i}$)
- *Unknown parameters*: 3D object point ($p$) and its projection $x_i$ in the $i$-th camera plane ($C_i$), where $i=1,2,\ldots,l$

3D Point Registration Description

FIG. 5

Problem statement

Given two or N images and their corresponding camera geometry/pose information, we determine 3D position, $p_k(x,y,z)$, of an object point of interest (POI), so that the similarity, $S\left(I_i(x_{i,k}), I_j(x_{j,k})\right)$, between its projected feature points on two image planes are maximized, that is $$p_k(x,y,z) = \max_{(x,y,z)} \left\{ \sum_{j=1, j\neq i}^{N-1} \sum_{i=1}^{j} \sum_{A} S(I_i(x_{i,k}), I_j(x_{j,k})) \right\}$$

where A is a region which surrounds the projected feature ($x_{i,k}$ or $x_{j,k}$) and $$x_{i,k} = P_i p_k$$
$$x_{j,k} = P_j p_k$$

and $$P_j = P_i T_{i,j}$$

3D Point Registration Description

Proposed Solution

Initialization of DE of point of interest (POI):

- Given the first two images
  - ➤ Detect distinguished features (POI) in each frame $x_{1,i}$, $x_{2,i}$
  - ➤ Perform correspondence analysis to find matched point pair $S(x_{1,i}, x_{2,i})$
  - ➤ Use the triangulation method to find initial estimate of 3D point $p_i(2)$ from the correspondent feature pair
  - ➤ Measure quality of 3D point reconstruction: $q(2)$

FIG. 6

3D Point Registration Description

Refine the initial estimate of $p_i\hat{Q}$ given the third image (1/2)

Step 1: determine reliable correspondent feature in image plane

- E-1
  - ➤ Detect distinguished features in the current frame $x_{3,i}$
  - ➤ Perform correspondence analysis $<x_{3,i}, x_{2,i}>$
- E-2
  - ➤ Project $p_i$ onto Camera $C_3$ to have $\tilde{x}_{3,i}$
- E-3
  - ➤ if $x_{3,i}$ is available, measure the distance betweeen $d(\tilde{x}_{3,i}, x_{3,i})$
    - ❖ if $d < \varepsilon$, $x_{3,i}$ is a reliable feature ;
    - ❖ else refine the $\tilde{x}_{3,i}$ by searching its surrounding to obtain $\hat{x}$; find the best match from candidates of refined $\hat{x}$ and $x_{3,i}$ as a new matched feature $x_{3,i}$;
  - ➤ else refine the $\tilde{x}_{3,i}$ by searching its surrounding as a new matched feature $x_{3,i}$;

FIG. 7

3D Point Registration Description

Refine the initial estimate of $p_i(2)$, gievn the third image (2/2)

Step 2: refine the 3D estimate $p_i$

- Measure the similarities $S(x_{3,i}, x_{2,i}), S(x_{3,i}, x_{1,i})$
- Refine the estimate of $p_i$ using a weighted average
  $$p_i(3) = w(1,3)p^{1,3} + w(2,3)p^{2,3} + w(1,2)p^{1,2}$$
  where the weights $w(1,3)$, $w(2,3)$ and $w(1,2)$ are determined by its correspondent similarity measure $S(1,3)$, $S(2,3)$ and $S(1,2)$
- Measure quality of 3D point reconstruction: $q(3)$

3D Point Registration Description

Optional steps for iterative refinement of 3D reconstruction $p_i(3)$ by repeating following steps until no improvement can be achieved (1/2)

➢ Step 1: Project $p_i$ onto Camera $C_1$, $C_2$ and $C_3$ and yield new feature points
$$x_{1,i}, x_{2,i}, x_{3,i}$$

➢ Step 2: Calculate the similarities among $(x_{1,i}, x_{2,i}, x_{3,i})$ to get the similarity measures $S(1,2)$, $S(2,3)$ and $S(1,3)$ ➢ Step 3: Compare with their previous measures, find the feature pair with the less $S$ value change, e.g. $S(1,2)$, among $\Delta S(1,2)$, $\Delta S(1,3)$ and $\Delta S(2,3)$ ➢ Step 4: Replace the third feature with the newly projected point; recalculate the similarities of this new feature with other two existing features, e.g., $S(1, 3)$ and $S(2,3)$;

3D Point Registration Description

FIG. 10

Optional steps for iterative refinement of 3D reconstruction $p_i(3)$ by repeating following steps until no improvement can be achieved (2/2)

➢ Step 5:
　　if $S(1,3)$ and $S(2,3)$ are improved,
　　　　re-determine its 3D points based on the triangulation
　　else
　　　　stop the process of the refinement;

➢ Step 6:
　　Update the estimate of the object 3D point via
　　$p_i(3) = \widetilde{w}(1,3)\hat{p}^{1,3} + \widetilde{w}(2,3)\hat{p}^{2,3} + w(1,2)p^{1,2}$
　　where the weights $\widetilde{w}(1,3)$, $\widetilde{w}(2,3)$ and $w(1,2)$ are determined
　　by its correspondent similarity measure $S(1,3)$, $S(2,3)$ and $S(1,2)$ ➢ Step 7:
　　Update quality measure of 3D point reconstruction: $q(3)$

FIG. 11

3D Point Registration Description

**Recursive update the estimates, given the *l*-th image (1/2)**

Step 1: determine reliable correspondent feature in image plane

- E-1
  - ➤ Detect distinguished features in the frame $x_{l,i}$
  - ➤ Perform correspondence analysis $< x_{l,i}, x_{l-1,i} >$
- E-2
  - ➤ Project $p_i$ onto Camera $C_l$ to have $\tilde{x}_{l,i}$
- E-3
  - ➤ *if* $x_{l,i}$ is available, measure the distance between $d(\tilde{x}_{l,i}, x_{l,i})$
    - ❖ *if* $d < \varepsilon$, $x_{l,i}$ is a reliable feature ;
    - ❖ *else* refine $\tilde{x}_{l,i}$ by searching its surrounding to obtain $\hat{x}$; find the best match from candidates of $\hat{x}$ and $x_{l,i}$ as a new matched feature $x_{l,i}$;
  - ➤ *else* refine $\tilde{x}_{l,i}$ by searching its surrounding as a new matched feature $x_{l,i}$;

3D Point Registration Description

**Recursive update the estimates, given the *l*-th image   (2/2)**

Step 2: refine the 3D estimate $p_i$

- Measure the similarity $S(l, l\text{-}1) = <x_{l,i}, x_{l-1,i}>$
- Reconstruct $p^{l,l-1}$ from pair $<x_{l,i}, x_{l-1,i}>$ by using the triangulation method
- Refine the estimate of $p_i$ using a weighted average
  $$p_i(l) = w(l-1)p_i(l-1) + w(l, l-1)p^{l,l-1}$$
  where $w(l\text{-}1)$ is related to $q(l\text{-}1)$ and $w(l,l\text{-}1)$ to $S(l,l\text{-}1)$
- Update quality measure of 3D point reconstruction: $q(l)$

FIG. 12

METHOD FOR ESTIMATING DISTANCE TO AN OBJECT VIA A VEHICULAR VISION SYSTEM

CROSS REFERENCE TO RELATED APPLICATIONS

The present application is a continuation of U.S. patent application Ser. No. 14/969,527, filed Dec. 15, 2015, now U.S. Pat. No. 10,713,506, which claims the filing benefits of U.S. provisional application Ser. No. 62/093,743, filed Dec. 18, 2014, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and, responsive to image processing of captured image data, provides distance estimation to objects exterior of the vehicle.

The present invention provides reliable distance estimation for detected objects. Typically, for a moving ego vehicle and static targets, structure from motion (SfM) is used for estimating the depth of the objects. SfM is typically computed over a pair of frames and the output depth is then post-processed. However, given the relatively low amount of motion and different degree of motion along different optical axes, the reliability of SfM varies. Particularly for wide field of view (FOV) optics (such as fish-eye lenses), the use of SfM is limited to about 3 meters in range and is very limited along the central area of the image where the motion flow would be along the optical axis for front and rear cameras.

The method of the present invention helps alleviate the reliability problem by first using the available frame data in a more structured environment to get more stable outputs as well as using some back-projection to reject bad or unstable outputs.

This technique is moving towards reliable depth estimation that may be competitive with camera systems with the ultrasonic sensors but with a greater range of estimation. The system of the present invention is not only applicable to wide angle optics but also to narrow angle FOV cameras, such as may be used in the side exterior rearview mirrors for lane watch or such as may be used at the vehicle windshield.

These and other objects, advantages, purposes and features of the present invention will become apparent upon review of the following specification in conjunction with the drawings.

BRIEF DESCRIPTION OF THE DRAWINGS

FIG. 5 shows equations for determining a 3D point position;

FIG. 6 shows the 3D point registration using an initialization of DE of a point of interest in accordance with the present invention;

FIGS. 7 and 8 show how the initial estimate is refined in accordance with the present invention;

FIGS. 9 and 10 show optional steps for iterative refinement of the 3D reconstruction of the present invention; and FIGS. 11 and 12 show the steps of recursive updating of the estimates to update a quality measure of the 3D point reconstruction in accordance with the present invention.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
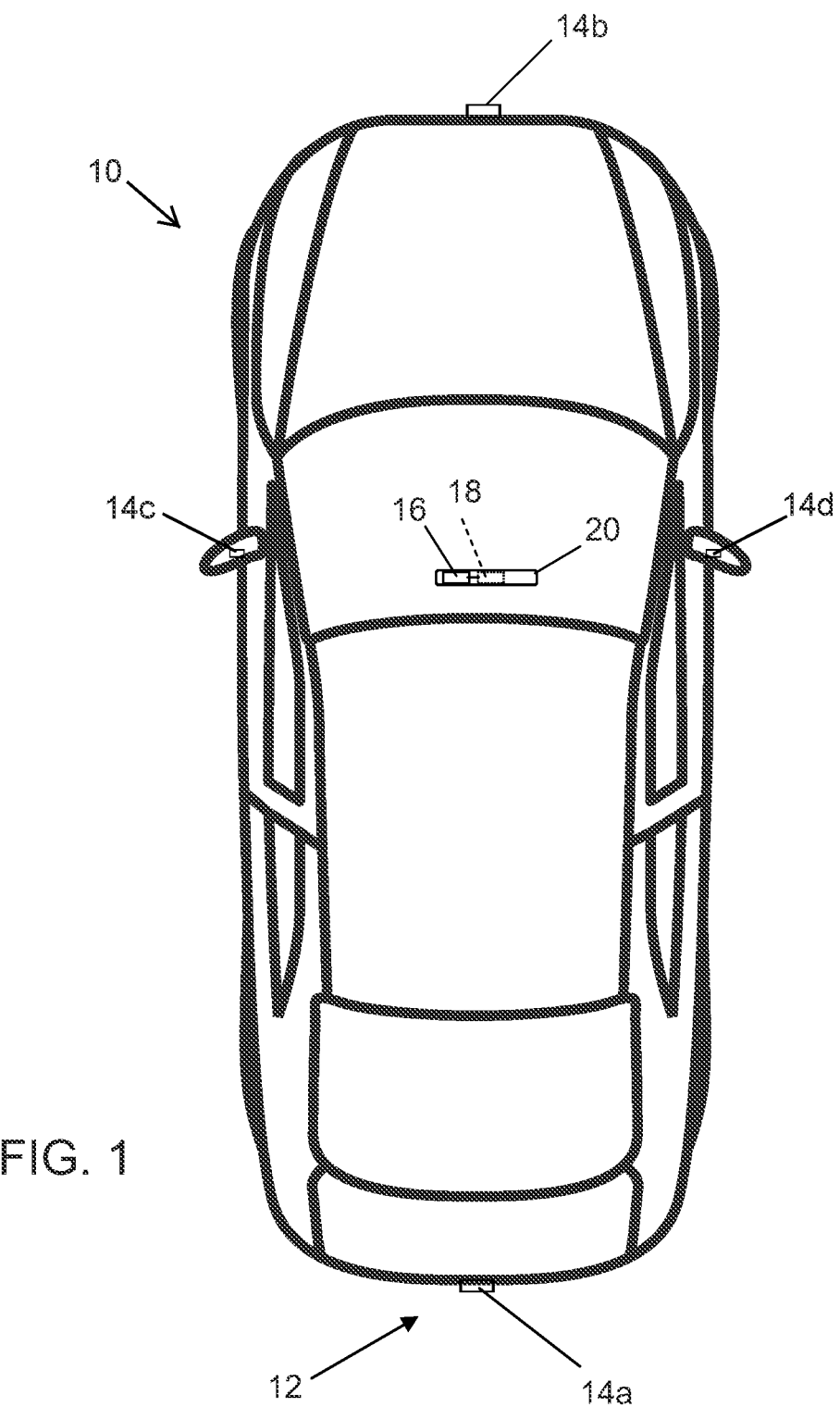
FIG. 1 is a plan view of a vehicle with a vision system that incorporates cameras in accordance with the present invention.
Figure 2:
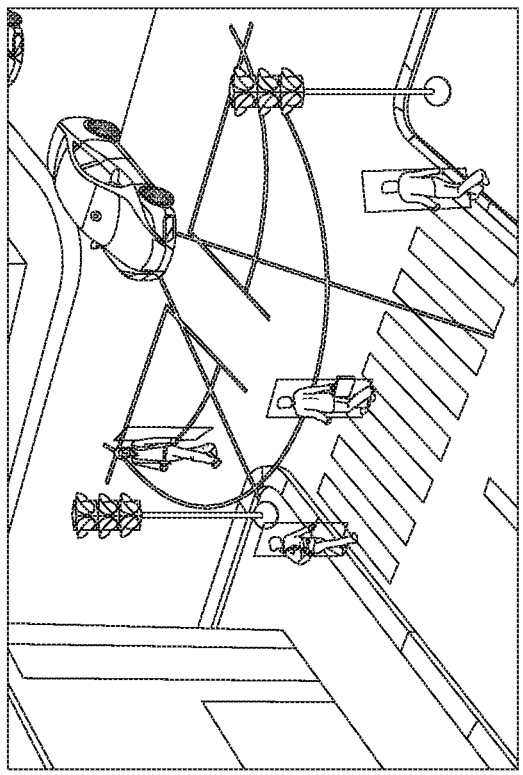
FIG. 2 shows a vehicle at an intersection and shows an image captured by a camera of the vehicle.
Figure 2:
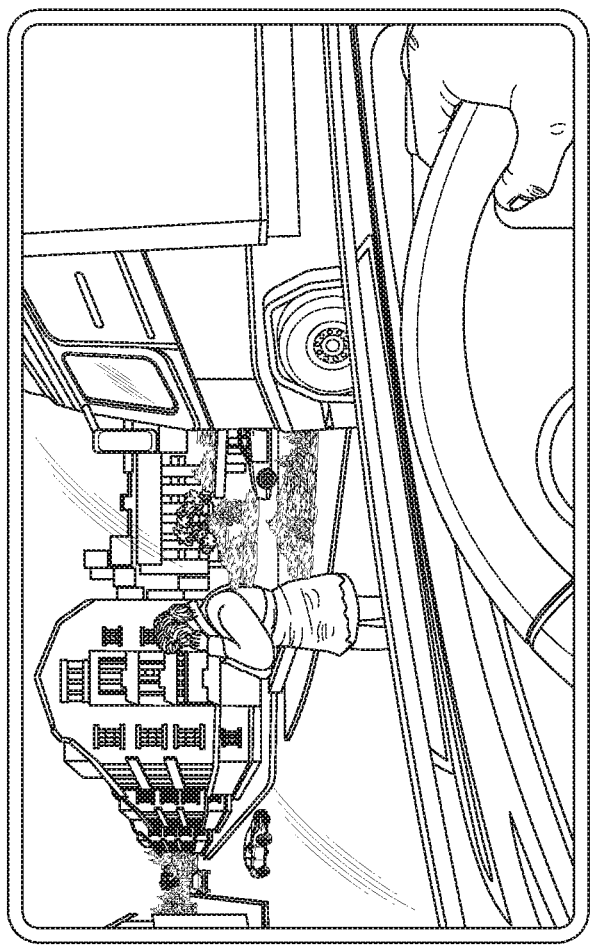
Figure 3:
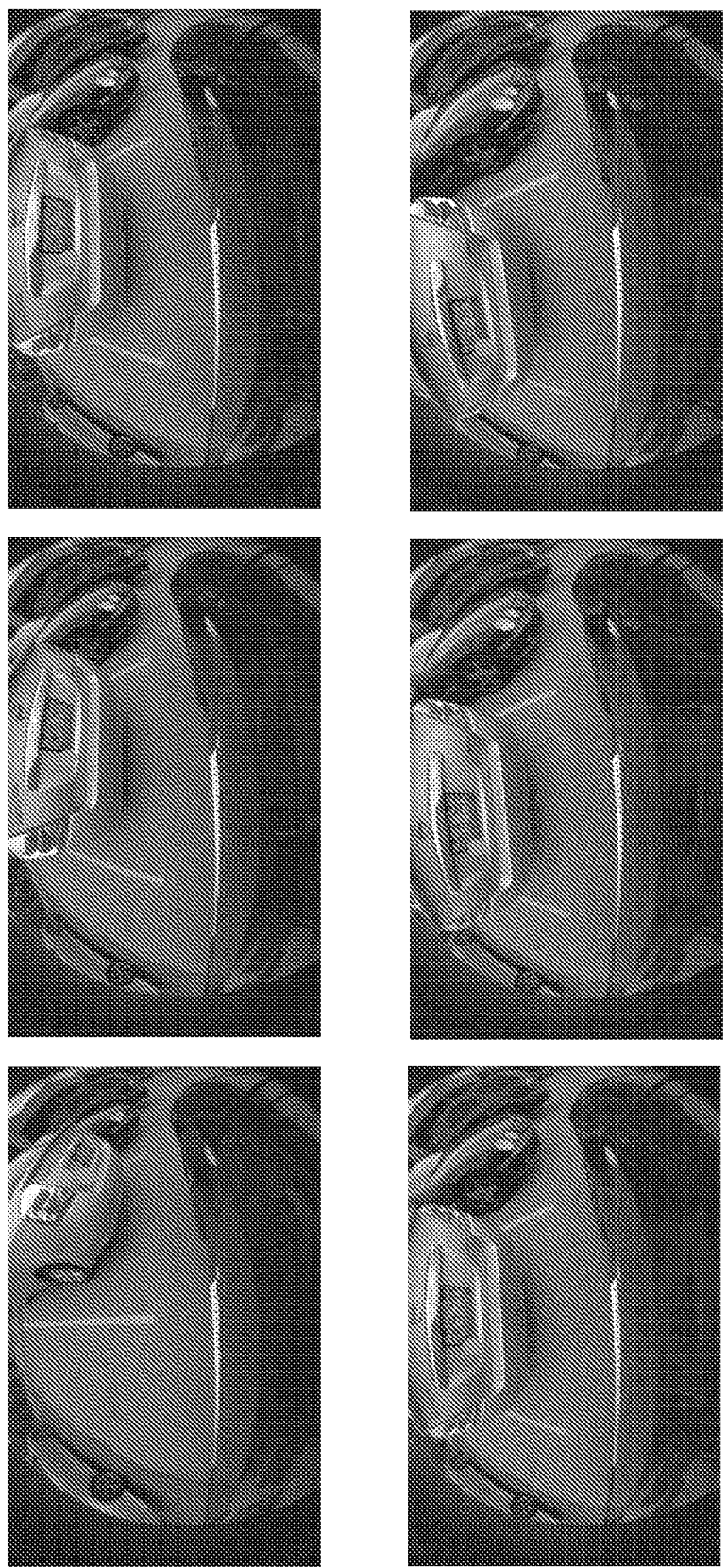
FIG. 3 shows images captured by a side camera using a fish-eye lens.
Figure 4:
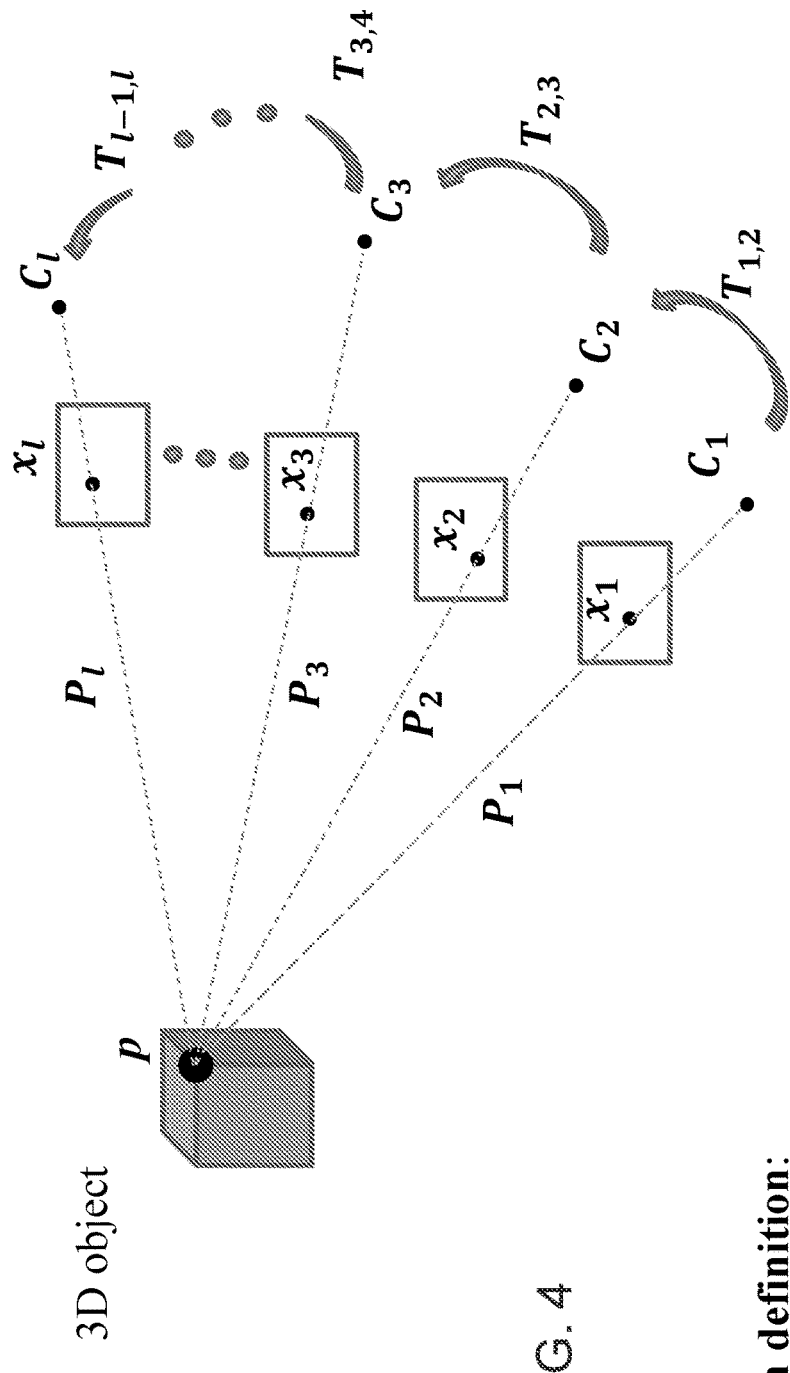
FIG. 4 shows a 3D point registration description suitable for use with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Surround awareness and driver assistance is a key marketable feature for vehicles. Generic object detection using a fish eye camera is one such feature. Distance estimation in the scene needed to add value to existing detection based algorithms (such as, for example, object detection (OD), blind spot detection (BSD), Automatic parking spot detection and/or the like). The distance estimation may act as a stand-alone distance estimation feature. Distance estimation is a triangulation-based SfM problem, which requires the information on (i) correspondent feature points in consecutive images and (ii) camera parameters at each viewpoint of a moving camera. Most past development centered around distance estimation using solving triangulation problems and bundle adjustment for refinement of estimates.

Use of fish-eye optics or lenses on vehicular cameras may have associated difficulties. There is an increase in the use of fish-eye optics with the developing market interest in smart surround view systems. The features cannot be measured exactly in these fish-eye images, and this leads to a loss in accuracy of distance estimation of points of interest. Such fish-eye optics thus create performance/robustness issues since the variations possible in the distance estimation due to the inaccurate measurement of image features in these images. In an image captured by use of a fish-eye lens, the features not only vary in size, but also in orientation.

The present invention provides a three dimensional (3D) point registration process to determine distances to objects present in the field of view of the camera. To mitigate the effect of inconsistent distance estimation of points of interest, a 3D point registration strategy of the present invention may be implemented. Utilizing the a priori knowledge about the optics and extrinsic orientation of the camera, the system may get an initial 3D reconstruction of points of interest (POIs) from current image feature pairs by solving a triangulation problem. The system may measure the reliability/quality of current 3D reconstruction by re-projecting the 3D POIs into an image plane. The system may refine the 3D reconstruction of POIs by weighted average when more than one reconstruction is available. The weighting factor is related to the reliability/quality measure of its 3D reconstruction using individual image feature pairs. Optionally, the system may provide iterative refinement of the 3D reconstruction by repeating the following steps until no improvement can be achieved. The steps include (a) refining the correspondent feature locations by comparing the similarity between the projected and the detected features, (b) selecting the corresponding features according to their similarity measurement, (c) repeating the 3D reconstruction by solving triangulation problem from newly selected corresponding pairs, and (d) determining a weighted average of all 3D reconstructions that yields 3D reconstructions of POIs.

As shown in the figures, the system of the present invention detects distinguished features (POIs) of a determined three dimensional object in each frame of captured image data and performs a correspondence analysis to find matched point pairs. Using a triangulation method, an initial estimate of a determined point may be found from the correspondent feature pair. The system may measure the quality of the 3D point reconstruction. The initial estimate of the point may be refined via further correspondence analysis and projections. The iterative refinement may be repeated until no improvement is achieved or little or no significant improvement is achieved (i.e., when the improvement is below a threshold level between iterations).

Thus, given two or more images and the corresponding camera geometry and position information, the system determines a 3D position of a point of interest (x, y, z) on an object. The similarity between the projected feature points on two image planes (as the vehicle moves relative to the object) may be maximized (see FIG. 5). As shown in FIG. 6, the system thus may detect distinguishing features or points of interest (POIs) in each frame and perform correspondence analysis to find matched point pairs (where the POI is in each of the frames of captured image data). The triangulation method is used to find an initial estimate of the 3D point location from the corresponding feature pair. The quality of the 3D point location reconstruction may then be measured.

As shown in FIGS. 7-10, when a third image plane is provided, the initial estimate of the 3D point location may be refined. As shown in FIGS. 11-12, the estimates may be updated as additional images are provided.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/02868 and/or WO 2013/016409, and/or U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication Nos. US-2006-0061008 and/or US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for estimating distance to an object via a vehicular vision system, the method comprising:

disposing a camera at a rear portion of a vehicle so as to view at least rearward of the vehicle, wherein the camera comprises a pixelated imaging array having a plurality of photosensing elements;

providing an electronic control unit (ECU) comprising an image processor operable to process image data captured by the camera;

capturing multiple frames of image data via the camera while the vehicle is moving;

providing captured frames of image data to the ECU;

processing via the image processor provided captured frames of image data to determine a three dimensional object present in a field of view of the camera;

determining a point of interest on the determined object by processing via the image processor provided captured frames of image data while the vehicle is moving relative to the determined object;

determining, by processing via the image processor of multiple provided captured frames of image data while the vehicle is moving relative to the determined object, and using triangulation based on the determined point of interest present in multiple provided captured frames of image data, an estimated location in three dimensional space of the determined point of interest relative to the vehicle;

estimating distance to the estimated location in three dimensional space of the determined point of interest on the determined object by comparing, one to another, provided captured frames of image data where there is movement of the determined point of interest of the determined object relative to the camera disposed at the vehicle; and responsive to the determined estimated location in three dimensional space of the determined point of interest, processing via the image processor additional provided captured frames of image data to enhance the estimation of the location in three dimensional space of the determined point of interest.

2. The method of claim 1, wherein determined points of interest in two or more provided captured frames of image data are compared to determine if they match.

3. The method of claim 1, wherein determining the point of interest on the determined object comprises detecting points of interest in two or more provided captured frames of image data and performing correspondence analysis to find matched point pairs in the two or more provided captured frames of image data.

4. The method of claim 1, comprising utilizing triangulation to determine an initial location of a determined point of interest from a corresponding pair of determined points of interest in first and second provided captured frames of image data.

5. The method of claim 1, comprising, responsive to processing via the image processor of provided captured frames of image data, (a) refining correspondent feature locations by comparing similarities between projected and detected points of interest, (b) selecting corresponding features according to their determined similarities and (c) repeating triangulation on newly selected corresponding pairs of determined points of interest.

6. The method of claim 1, comprising repeating processing via the image processor of additional provided captured frames of image data to enhance the estimated location in three dimensional space of the determined point of interest until a difference between subsequent estimations is less than a threshold level.

7. A method for estimating distance to an object via a vehicular vision system, the method comprising:

disposing a camera at a vehicle so as to view exterior of the vehicle, wherein the camera comprises a pixelated imaging array having a plurality of photosensing elements;

wherein the camera comprises a wide angle lens, and wherein the camera, when disposed at the vehicle, has a wide angle field of view exterior of the vehicle;

providing an electronic control unit (ECU) comprising an image processor operable to process image data captured by the camera;

capturing multiple frames of image data via the camera while the vehicle is moving;

providing captured frames of image data to the ECU;

processing via the image processor provided captured frames of image data to determine a three dimensional object present in a field of view of the camera;

determining a point of interest on the determined object by processing via the image processor provided captured frames of image data while the vehicle is moving relative to the determined object;

wherein determined points of interest in two or more provided captured frames of image data are compared to determine if they match;

determining, by processing via the image processor of multiple provided captured frames of image data while the vehicle is moving relative to the determined object, and using triangulation based on the determined point of interest present in multiple provided captured frames of image data, an estimated location in three dimensional space of the determined point of interest relative to the vehicle;

estimating distance to the estimated location in three dimensional space of the determined point of interest on the determined object by comparing, one to another, provided captured frames of image data where there is movement of the determined point of interest of the determined object relative to the camera disposed at the vehicle; and responsive to the determined estimated location in three dimensional space of the determined point of interest, processing via the image processor additional provided captured frames of image data to enhance the estimation of the location in three dimensional space of the determined point of interest.

8. The method of claim 7, comprising utilizing triangulation to determine an initial location of a determined point of interest from a corresponding pair of determined points of interest in first and second provided captured frames of image data.

9. The method of claim 7, comprising, responsive to processing via the image processor of provided captured frames of image data, (a) refining correspondent feature locations by comparing similarities between projected and detected points of interest, (b) selecting corresponding features according to their determined similarities and (c) repeating triangulation on newly selected corresponding pairs of determined points of interest.

10. The method of claim 7, comprising repeating processing via the image processor of additional provided captured frames of image data to enhance the estimated location in three dimensional space of the determined point of interest until a difference between subsequent estimations is less than a threshold level.

11. A method for estimating distance to an object via a vehicular vision system, the method comprising:
- disposing a camera at a vehicle so as to view exterior of the vehicle, wherein the camera comprises a pixelated imaging array having a plurality of photosensing elements;
- wherein the camera comprises a wide angle lens, and wherein the camera, when disposed at the vehicle, has a wide angle field of view exterior of the vehicle;
- providing an electronic control unit (ECU) comprising an image processor operable to process image data captured by the camera;
- capturing multiple frames of image data via the camera while the vehicle is moving;
- providing captured frames of image data to the ECU;
- processing via the image processor provided captured frames of image data to determine a three dimensional object present in a field of view of the camera;
- determining a point of interest on the determined object by processing via the image processor provided captured frames of image data while the vehicle is moving relative to the determined object;
- wherein determining the point of interest on the determined object comprises detecting points of interest in two or more provided captured frames of image data and performing correspondence analysis to find matched point pairs in the two or more provided captured frames of image data;
- determining, by processing via the image processor of multiple provided captured frames of image data while the vehicle is moving relative to the determined object, and using triangulation based on the determined point of interest present in multiple provided captured frames of image data, an estimated location in three dimensional space of the determined point of interest relative to the vehicle;
- estimating distance to the estimated location in three dimensional space of the determined point of interest on the determined object by comparing, one to another, provided captured frames of image data where there is movement of the determined point of interest of the determined object relative to the camera disposed at the vehicle; and
- responsive to the determined estimated location in three dimensional space of the determined point of interest, processing via the image processor additional provided captured frames of image data to enhance the estimation of the location in three dimensional space of the determined point of interest.

12. The method of claim 11, comprising, responsive to processing via the image processor of provided captured frames of image data, (a) refining correspondent feature locations by comparing similarities between projected and detected points of interest, (b) selecting corresponding features according to their determined similarities and (c) repeating triangulation on newly selected corresponding pairs of determined points of interest.

13. The method of claim 11, comprising repeating processing via the image processor of additional provided captured frames of image data to enhance the estimated location in three dimensional space of the determined point of interest until a difference between subsequent estimations is less than a threshold level.

14. A method for estimating distance to an object via a vehicular vision system, the method comprising:
- disposing a camera at a rear portion of a vehicle so as to view at least rearward of the vehicle, wherein the camera comprises a pixelated imaging array having a plurality of photosensing elements;
- providing an electronic control unit (ECU) comprising an image processor operable to process image data captured by the camera;
- capturing multiple frames of image data via the camera while the vehicle is moving;
- providing captured frames of image data to the ECU;
- processing via the image processor provided captured frames of image data to determine a three dimensional object present in a field of view of the camera;
- determining a point of interest on the determined object by processing via the image processor provided captured frames of image data while the vehicle is moving relative to the determined object;
- determining, by processing via the image processor of multiple provided captured frames of image data while the vehicle is moving relative to the determined object, and using triangulation based on the determined point of interest present in multiple provided captured frames of image data, an estimated location in three dimensional space of the determined point of interest relative to the vehicle;
- estimating distance to the estimated location in three dimensional space of the determined point of interest on the determined object by comparing, one to another, provided captured frames of image data where there is movement of the determined point of interest of the determined object relative to the camera disposed at the vehicle;
- utilizing triangulation to determine an initial location of a determined point of interest from a corresponding pair of determined points of interest in first and second provided captured frames of image data; and
- processing via the image processor a third provided captured frame of image data to refine the determined initial location of the point of interest.

15. The method of claim 14, wherein the camera comprises a wide angle lens, and wherein the camera, when disposed at the vehicle, has a wide angle field of view exterior of the vehicle.

16. A method for estimating distance to an object via a vehicular vision system, the method comprising:
- disposing a camera at a vehicle so as to view exterior of the vehicle, wherein the camera comprises a pixelated imaging array having a plurality of photosensing elements;

wherein the camera comprises a wide angle lens, and wherein the camera, when disposed at the vehicle, has a wide angle field of view exterior of the vehicle;

providing an electronic control unit (ECU) comprising an image processor operable to process image data captured by the camera;

capturing multiple frames of image data via the camera while the vehicle is moving;

providing captured frames of image data to the ECU;

processing via the image processor provided captured frames of image data to determine a three dimensional object present in a field of view of the camera;

determining a point of interest on the determined object by processing via the image processor provided captured frames of image data while the vehicle is moving relative to the determined object;

wherein determined points of interest in two or more provided captured frames of image data are compared to determine if they match;

determining, by processing via the image processor of multiple provided captured frames of image data while the vehicle is moving relative to the determined object, and using triangulation based on the determined point of interest present in multiple provided captured frames of image data, an estimated location in three dimensional space of the determined point of interest relative to the vehicle;

estimating distance to the estimated location in three dimensional space of the determined point of interest on the determined object by comparing, one to another, provided captured frames of image data where there is movement of the determined point of interest of the determined object relative to the camera disposed at the vehicle;

utilizing triangulation to determine an initial location of a determined point of interest from a corresponding pair of determined points of interest in first and second provided captured frames of image data; and processing via the image processor a third provided captured frame of image data to refine the determined initial location of the point of interest.

17. A method for estimating distance to an object via a vehicular vision system, the method comprising:

disposing a camera at a vehicle so as to view exterior of the vehicle, wherein the camera comprises a pixelated imaging array having a plurality of photosensing elements;

wherein the camera comprises a wide angle lens, and wherein the camera, when disposed at the vehicle, has a wide angle field of view exterior of the vehicle;

providing an electronic control unit (ECU) comprising an image processor operable to process image data captured by the camera;

capturing multiple frames of image data via the camera while the vehicle is moving;

providing captured frames of image data to the ECU;

processing via the image processor provided captured frames of image data to determine a three dimensional object present in a field of view of the camera;

determining a point of interest on the determined object by processing via the image processor provided captured frames of image data while the vehicle is moving relative to the determined object;

wherein determining the point of interest on the determined object comprises detecting points of interest in two or more provided captured frames of image data and performing correspondence analysis to find matched point pairs in the two or more provided captured frames of image data;

determining, by processing via the image processor of multiple provided captured frames of image data while the vehicle is moving relative to the determined object, and using triangulation based on the determined point of interest present in multiple provided captured frames of image data, an estimated location in three dimensional space of the determined point of interest relative to the vehicle;

estimating distance to the estimated location in three dimensional space of the determined point of interest on the determined object by comparing, one to another, provided captured frames of image data where there is movement of the determined point of interest of the determined object relative to the camera disposed at the vehicle; and utilizing triangulation to determine an initial location of a determined point of interest from a corresponding pair of determined points of interest in first and second provided captured frames of image data, and comprising processing via the image processor a third provided captured frame of image data to refine the determined initial location of the point of interest.

\* \* \* \* \*